United States Patent
Zhou et al.

(10) Patent No.: US 9,792,698 B2
(45) Date of Patent: Oct. 17, 2017

(54) IMAGE REFOCUSING

(71) Applicant: Nokia Technologies Oy, Espoo (FI)

(72) Inventors: Hui Zhou, Sunnyvale, CA (US); Timo Ahonen, San Carlos, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/894,335

(22) PCT Filed: May 30, 2013

(86) PCT No.: PCT/US2013/043247
§ 371 (c)(1),
(2) Date: Nov. 25, 2015

(87) PCT Pub. No.: WO2014/193377
PCT Pub. Date: Dec. 4, 2014

(65) Prior Publication Data
US 2016/0104291 A1 Apr. 14, 2016

(51) Int. Cl.
*G06K 9/34* (2006.01)
*G06K 9/36* (2006.01)
(Continued)

(52) U.S. Cl.
CPC .................. *G06T 7/37* (2017.01); *G06T 5/50* (2013.01); *G06T 7/11* (2017.01); *G06T 7/194* (2017.01);
(Continued)

(58) Field of Classification Search
CPC ....... G06T 7/0069; G06T 7/0081; G06T 5/50; G06T 7/0036; G06T 2207/20221;
(Continued)

(56) References Cited

U.S. PATENT DOCUMENTS 8,432,434 B2 * 4/2013 Veeraraghavan ...... G01B 11/22
345/419
8,493,432 B2 * 7/2013 Taguchi ............. H04N 5/23238
348/36
(Continued)

FOREIGN PATENT DOCUMENTS

JP 2013026844 A 2/2013
KR 1020120039855 A 4/2012
WO 2007/087405 A2 8/2007

OTHER PUBLICATIONS

David E. Jacobs et al. ("Focal Stack Compositiing for Depth of Field Control", Jan. 2012, Standford Computer Graphics Laboratory Technical Report Jan. 2012, pp. 1-10).*
(Continued)

*Primary Examiner* — Kanjibhai Patel
(74) *Attorney, Agent, or Firm* — Harrington & Smith

(57) ABSTRACT

A method including automatically segmenting regions of images of a focal stack into segment regions; and based, at least partially, upon selection of one or more of the segment regions, generating a refocused image which induces different ones of the segment regions from at least two of the images of the focal stack. An apparatus including an image segmentator for a focal stack of images, where the image segmentator is configured to automatically form segment regions for each of the images; and a focal stack fuser configured to fuse the focal stack of images into a refocused image, where the refocused image comprises different ones of the segment regions from at least two of the images of the focal stack.

13 Claims, 8 Drawing Sheets

(51) Int. Cl.
  *G06T 7/37* (2017.01)
  *G06T 5/50* (2006.01)
  *H04N 5/232* (2006.01)
  *G06T 7/571* (2017.01)
  *G06T 7/11* (2017.01)
  *G06T 7/194* (2017.01)

(52) U.S. Cl.
  CPC ......... *G06T 7/571* (2017.01); *H04N 5/23212* (2013.01); *H04N 5/23232* (2013.01); *G06T 2207/10016* (2013.01); *G06T 2207/10148* (2013.01); *G06T 2207/20221* (2013.01)

(58) Field of Classification Search
  CPC . G06T 2207/10148; G06T 2207/20144; G06T 2207/10016; H04N 5/23232; H04N 5/23212
  USPC .................................................. 382/173, 284
  See application file for complete search history.

(56) References Cited

U.S. PATENT DOCUMENTS

| | | | | |
|---|---|---|---|---|
| 8,559,705 | B2* | 10/2013 | Ng | G06T 5/001 345/157 |
| 8,705,801 | B2* | 4/2014 | Kawamura | G01C 3/06 382/106 |
| 8,989,447 | B2* | 3/2015 | Sezer | G06T 7/004 382/106 |
| 2003/0002870 | A1 | 1/2003 | Baron | |
| 2011/0175993 | A1 | 7/2011 | Uemori et al. | |
| 2012/0249550 | A1 | 10/2012 | Akeley et al. | |
| 2013/0022261 | A1 | 1/2013 | Imai et al. | |
| 2013/0033582 | A1 | 2/2013 | Sun et al. | |
| 2013/0044254 | A1 | 2/2013 | Tzur | |
| 2014/0313288 | A1* | 10/2014 | Dai | H04N 13/0207 348/43 |
| 2015/0062370 | A1* | 3/2015 | Shroff | H04N 5/2226 348/222.1 |

OTHER PUBLICATIONS

International Search Report and Written Opinion received for corresponding Patent Cooperation Treaty Application No. PCT/US2013/043247, dated Feb. 27, 2014, 12 pages.
"Focal Sweep Camera (Fosera)", Cave Projects, Retrieved on Feb. 27, 2017, Webpage available at: http://www.cs.columbia.edu/CAVE/projects/focal_sweep_camera/.
"Camera HACK: DOF—Changeable Photos with an SLR", The Chaos Collective, Retrieved on Feb. 27, 2017, Webpage available at: http://chaoscollective.org/projects/dof/.
"Lytro", Lytro, Retrieved on Feb. 27, 2017, Webpage available at: https://www.lytro.com/.
Ajdin et al., "Reduced Depth of Field Using Multi-Image Fusion", Proc. SPIE 8667, Multimedia Content and Mobile Devices, vol. 8667, 2013, 6 Pages.
Moreno-Noguer et al., "Active Refocusing of Images and Videos", ACM Transactions on Graphics (TOG)—Proceedings of ACM SIGGRAPH, vol. 26, No. 3, Jul. 2007, pp. 67-1-67-9.
"Toshiba announces light-field focus-later camera sensor", Expert Reviews, Retrieved on Feb. 23, 2017, Webpage available at: http://www.expertreviews.co.uk/digital-cameras/1296709/toshiba-announces-light-field-focus-later-camera-sensor.
Extended European Search Report received for corresponding European Patent Application No. 13885829.5, dated Feb. 7, 2017, 9 pages.
Vaquero et al., "Generalized Autofocus", IEEE Workshop on Applications of Computer Vision, Jan. 5-7, 2011, pp. 511-518.
Reinhard et al. "Depth-Of-Field-Based Alpha-Matte Extraction", Proceedings of the 2nd symposium on Applied perception in graphics and visualization, Aug. 26-28, 2005, pp. 95-102.

* cited by examiner

IMAGE REFOCUSING

RELATED APPLICATION

This application was originally filed as Patent Cooperation Treaty Application No. PCT/US2013/043247 filed May 30, 2013.

BACKGROUND

Technical Field

The exemplary and non-limiting embodiments relate generally to refocusing of an image and, more particularly, to post-capture image refocusing.

Brief Description of Prior Developments

When an image is taken, such as with a camera, one or more regions in the image may be out of focus, such as because of different distances from the camera lens for example. This is true even with a camera having an auto-focus function. Post-capture refocusing of an image to produce a refocused image is sometimes desirable.

SUMMARY

The following summary is merely intended to be exemplary. The summary is not intended to limit the scope of the claims.

In accordance with one aspect, an example embodiment is provided in an apparatus comprising means for segmenting at least one region of a focal stack of images into at least one segment region; and means for generating a refocused image based, at least partially, upon selection of one or more of the at least one segment region, where the refocused image comprises different ones of the at least one segment region from at least two of the images of the focal stack, and/or the at least one segment region having been processed differently than at least one other one of the regions.

In accordance with another aspect, an example embodiment is provided in an apparatus comprising at least one processor; and at least one memory including computer program code, where the at least one memory and the computer program code are configured to, with the at least one processor, to form segment regions for at least some of the images; and fuse the focal stack of images into a refocused image, where the refocused image comprises different ones of the segment regions from at least two of the images of the focal stack.

In accordance with another aspect, an example embodiment is provided in an apparatus comprising an image segmentator for a focal stack of images, where the image segmentator is configured to form segment regions for each of the images; and a focal stack fuser configured to fuse the focal stack of images into a refocused image. The refocused image comprises different ones of the segment regions from at least two of the images of the focal stack.

In accordance with another aspect, an example method comprises segmenting regions of images of a focal stack into segment regions; and based, at least partially, upon selection of one or more of the segment regions, generating a refocused image comprising different ones of the segment regions from at least two of the images of the focal stack.

In accordance with another aspect, an example embodiment is provided in a non-transitory program storage device readable by a machine, tangibly embodying a program of instructions executable by the machine for performing operations, the operations comprising segmenting regions of a focal stack of images into segment regions; and based, at least partially, upon selection of one or more of the segment regions, generating a refocused image comprising different ones of the segment regions from at least two of the images of the focal stack.

In accordance with another aspect, an example embodiment is provided in an apparatus comprising at least one processor; and at least one memory including computer program code, where the at least one memory and the computer program code are configured to, with the at least one processor, to segment regions of a focal stack of images into segment regions; and based, at least partially, upon selection of one or more of the segment regions, generate a refocused image comprising different ones of the segment regions from at least two of the images of the focal stack.

In accordance with another aspect, an example embodiment is provided in an apparatus comprising at least one processor; and at least one memory including computer program code, where the at least one memory and the computer program code are configured to, with the at least one processor, to form a segment region for one or more of the images; and generate a new image based, at least partially, upon selection of the segment region(s), where the new image comprises the segment region(s) having been processed differently than at least one other one of the segment regions.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
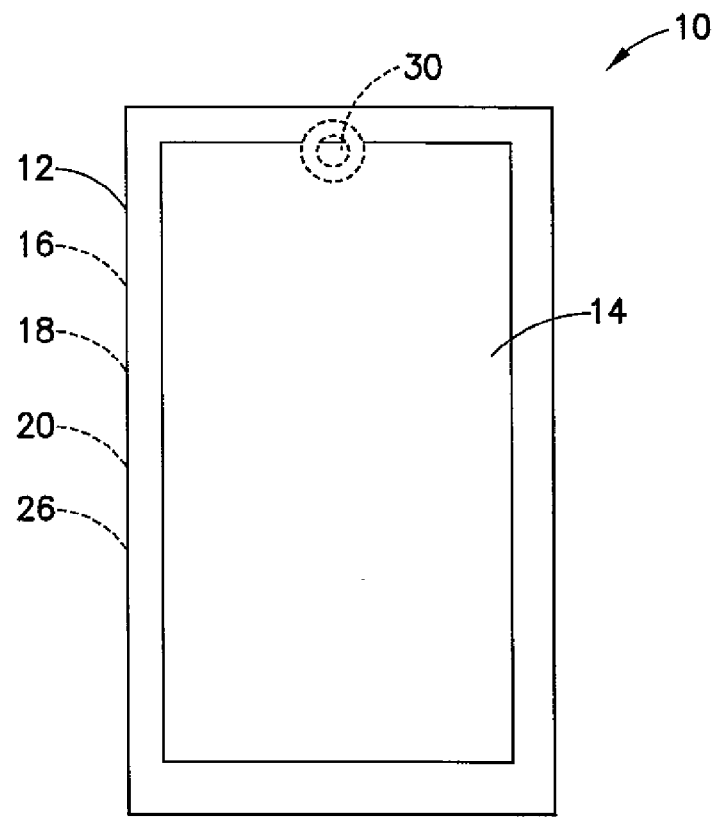
FIG. 1 is a front view of an apparatus comprising features of an example embodiment.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
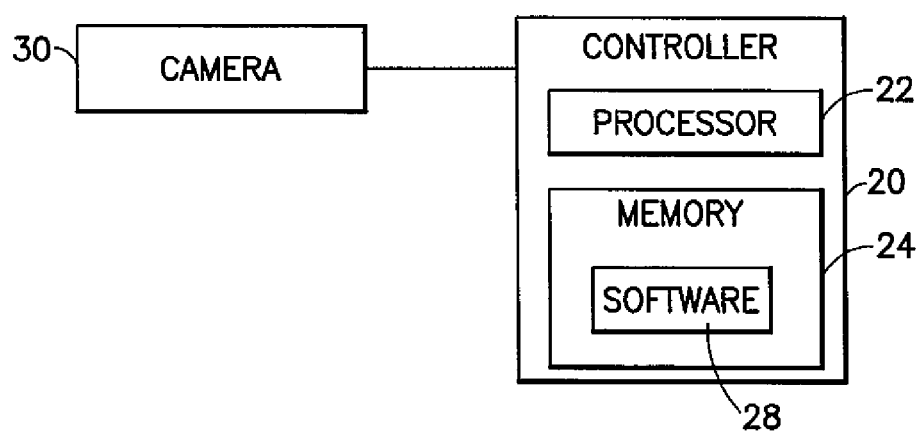
FIG. 2 is a diagram illustrating some of the element of the apparatus shown in FIG. 2.

The apparatus 10 is a hand-held communications device which includes a telephone application. In an alternate example the apparatus might not comprise a telephone application. In the example shown in FIG. 1, the apparatus 10 may also comprise an Internet browser application, camera application, video recorder application, music player and recorder application, email application, navigation application, gaming application, and/or any other suitable electronic device application, such as may be provided on a smartphone or tablet computer for example. Referring to both FIGS. 1 and 2, the apparatus 10, in this example embodiment, comprises a housing 12, a display module 14, a receiver 16, a transmitter 18, a rechargeable battery 26, and a controller 20 which may include at least one processor 22, at least one memory 24, and software 28. However, all of these features are not necessary to implement the features described below. For example, features as described herein may be used in a camera or video recorder which does not have a transmitter or receiver.

The receiver 16 and transmitter 18 form a wireless mobile communication interface to allow the apparatus 10 to communicate with a wireless telephone system, such as a mobile telephone base station for example. The wireless mobile communication interface 16, 18 may allow the apparatus 10 to communicate such as by 4G, 4G LTE, 3G, CDMA, etc. for example. However, in an alternate example embodiment the receiver 16 and transmitter 18 might not be provided, such as when the apparatus 10 does not have telephone capabilities or wireless Internet capabilities. For example, the apparatus 10 might merely be a gaming device having a camera. Internet access for the apparatus 10 might be provided by a short range communications system through a television console or a wireless WLAN for example. These are only some examples, and should not be considered as limiting.

The apparatus 10 further comprises a camera 30. The apparatus may comprise more than one camera. In this example the camera 30 is able to take still photo images and video images. The camera 30 has a lens which may be moved to provide different focal planes. The apparatus 30 may have suitable software such as part of software 28 to provide auto-focus capability.

In the example shown, the apparatus 10 has a post-capture refocus system 32 (see FIG. 3) which may be used to provide post-capture refocus. To achieve re-focusing, three steps are used comprising:

capturing multiple images focused at different focal planes,
indicating and selecting individual segment regions from the captured images to refocus, and
generating a refocused image which includes segment regions from at least two of the different focal plane images.

The step of generating may comprise generating a refocused image which includes segment regions from one or more of the different focal plane images, where pixels within some of the regions may be processed (such as artificially blurred for example) through means of digital image processing.

Features as described herein may be used to form:
1. An image composed of segment regions originating from two or more focal stack images, and/or
2. An image composed of segment regions originating from one or more focal stack images, where at least one segment region has been processed differently than the other regions.

Figure 3:
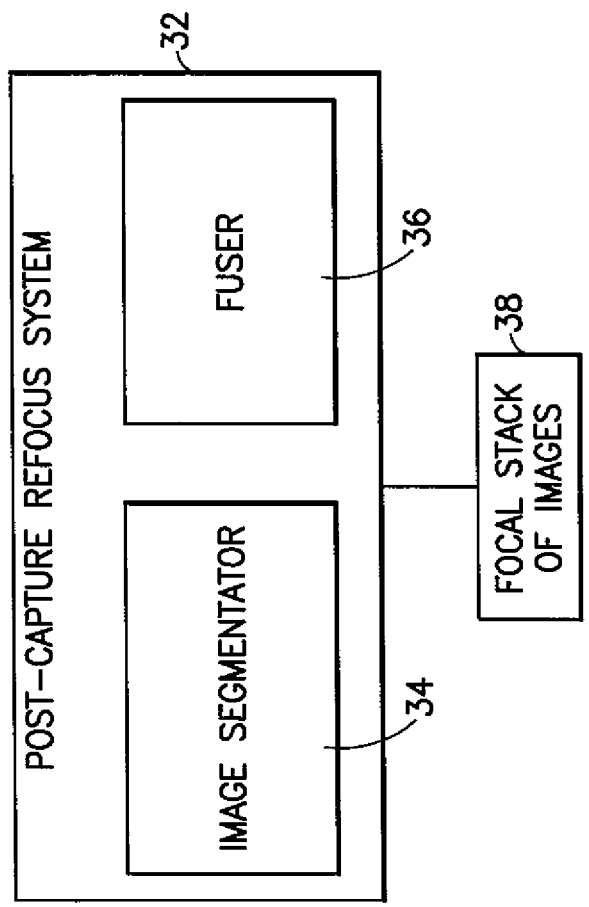
FIG. 3 is a diagram illustrating some of the features of the apparatus shown in FIG. 1.

Referring also to FIG. 3, the apparatus comprises a post-capture refocus system 32 which may comprise, for example, the processor 22, the memory 24 and some of the software 28. The post-capture refocus system 32 in this example comprises an image segmentator 34 and an image fuser 36. The system 32 is connected to a focal stack of images 38, such as stored in the memory 24. Features as described herein may be used for mobile imaging, manipulating camera focus/Depth of Field, and image segmentation and blending for example.

There are many ways a user may indicate a refocus object. For example, a user can draw strokes and the system can calculate the bounding box of the strokes and, thus, a region is defined. However, with features as described herein, the user does not need to define a refocus region or object. Instead, regions are automatically segmented from focal stack images based on different focus planes. After this automatic process, a user is subsequently allowed to pick from a plurality of segment regions which regions should be refocused. A user can simply choose the refocus region(s) to be used in a subsequently generated refocus image by a simple screen touch for example. In an alternate example embodiment, rather than having the regions automatically segmented, this could be done non-automatically, such as by the user initiating the process.

Figure 4:
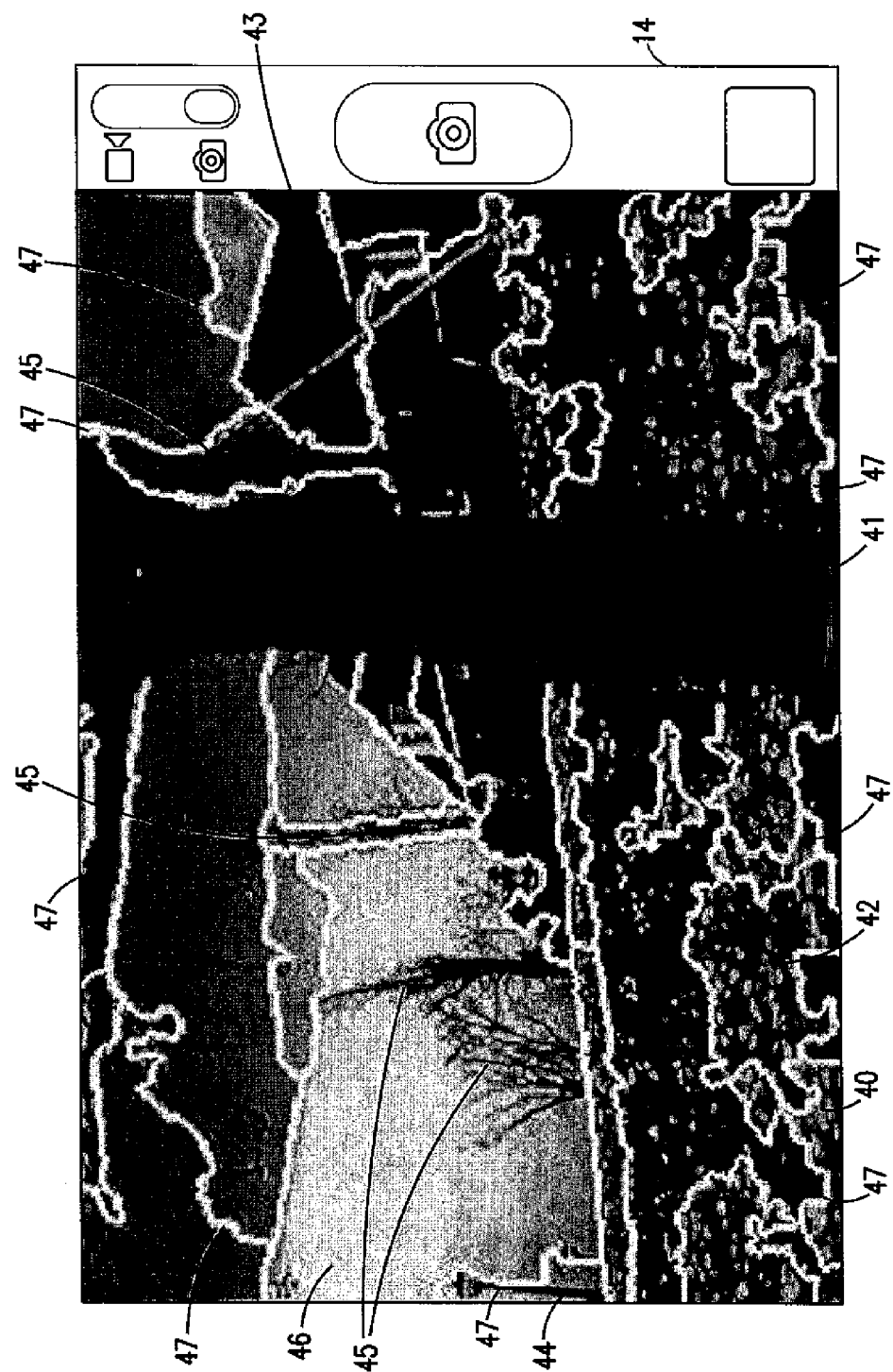
FIG. 4 is an illustration of an example image displayed on the display of the apparatus shown in FIG. 1.

Referring also to FIG. 4, an image 40 is shown on the display 14. The display 14 may be a touchscreen which also functions as a user interface. The image 40 in this example is a landscape type of image with a near tree 41, flowers 42, a house 43, lamp posts 44, distant trees 45 and the sky 46. The image 40 is shown displayed with boundaries 47 of segment regions on the image 40. One of the boundaries, around most of the near tree 41 in this example, may be of a different color from the other boundaries to indicate or highlight a default focusing region to the user. This type of image may be presented to the user after automatic segmenting has occurred to indicate to the user where all regions are pre-segmented. The user may then subsequently select one or more of these segmented regions (defined by the boundaries 47) to identify the region(s) to be provided refocused in the subsequently generated refocused image.

Figure 5A:
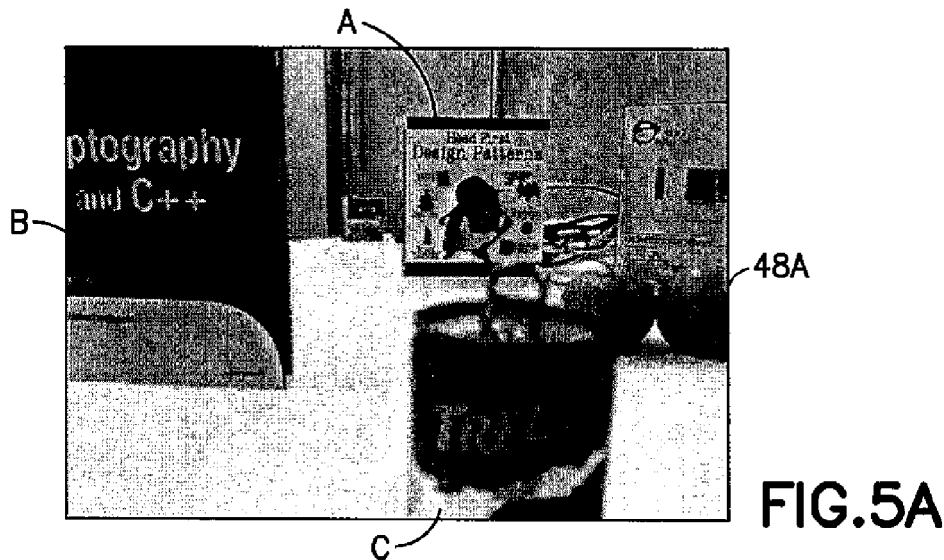
FIGS. 5A-5C are illustrations of examples of images in a focal stack of images.
Figure 5B:
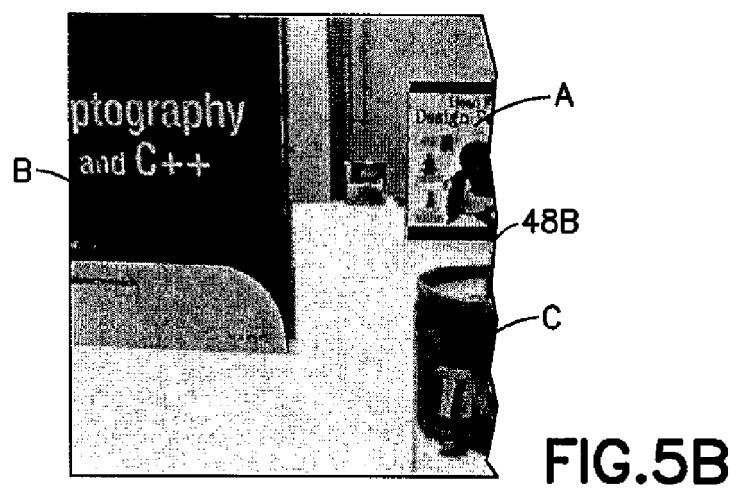
Figure 5C:
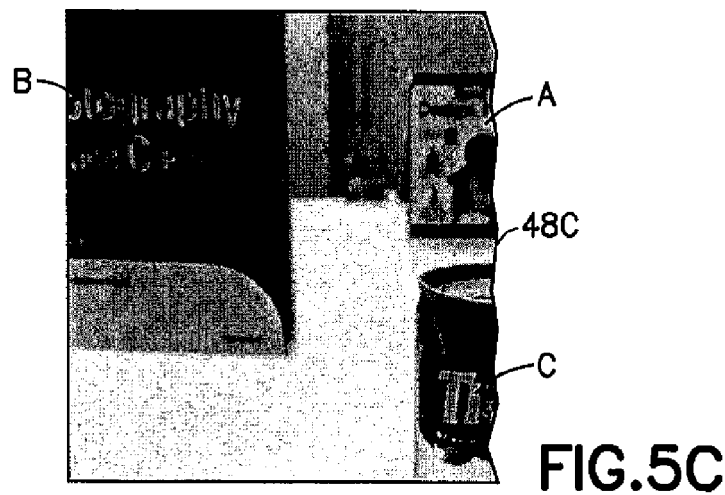

Referring also to FIGS. 5A, 5B, and 5C, three images 48A, 98B, 48C of a focal stack of images is illustrated (part of the images are not shown in FIGS. 5B and 5C merely for the sake of simplicity). The first image 48A has the item A in focus. However, the closer items B and C are out of focus. The second image 48B has the item B in focus. However, the farther item A and the closer item C are out of focus. The third image 48C has the item C in focus. However, the farther items A and B are out of focus. Each image 48A, 48B and 48C has a different focal distance provided by the different lens positions when the images were taken. Thus, a focal stack containing a series of images obtained from different lens position has been captured by the camera 30.

Figure 6:
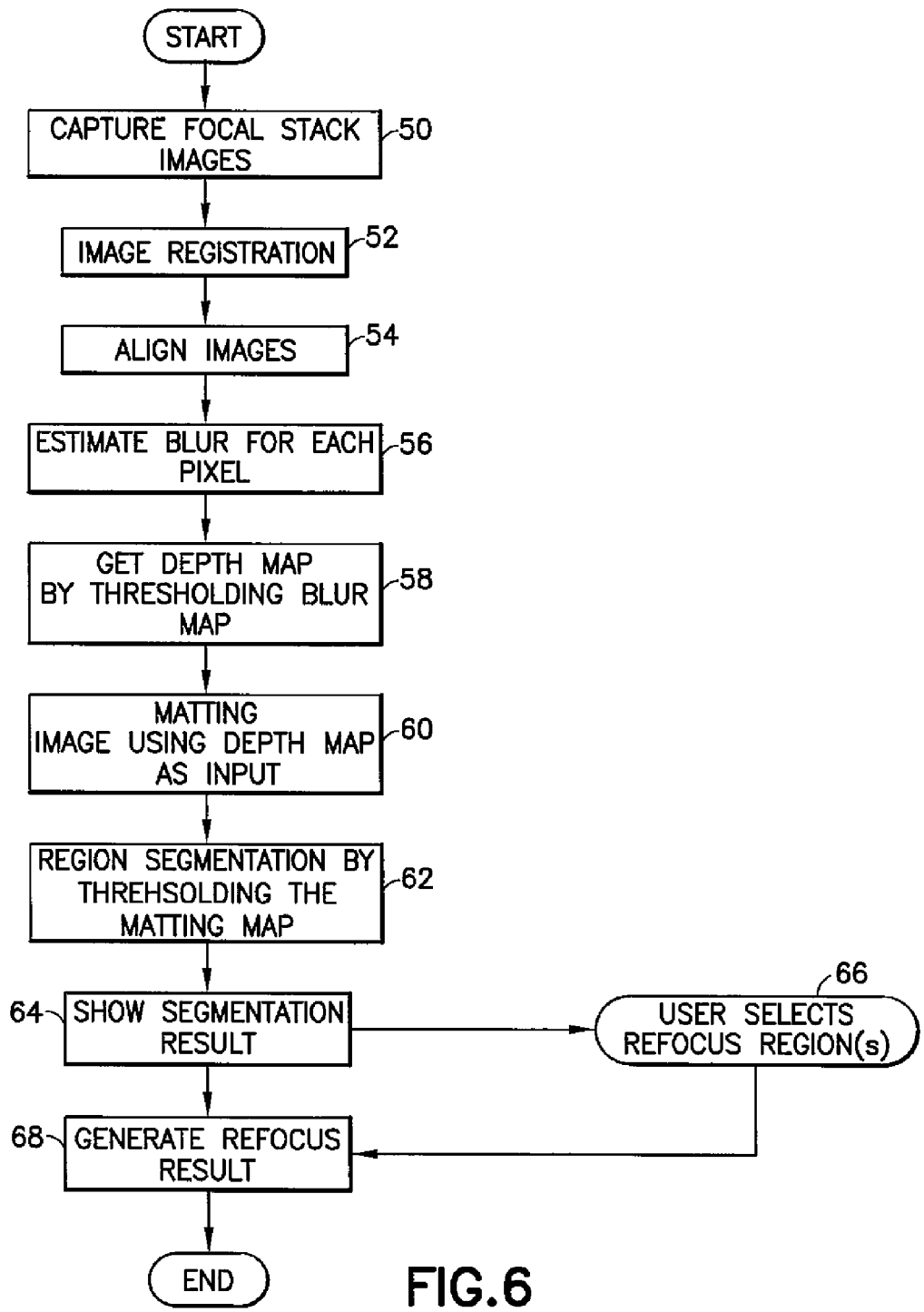
FIG. 6 is a diagram of an example method.
Figure 7:
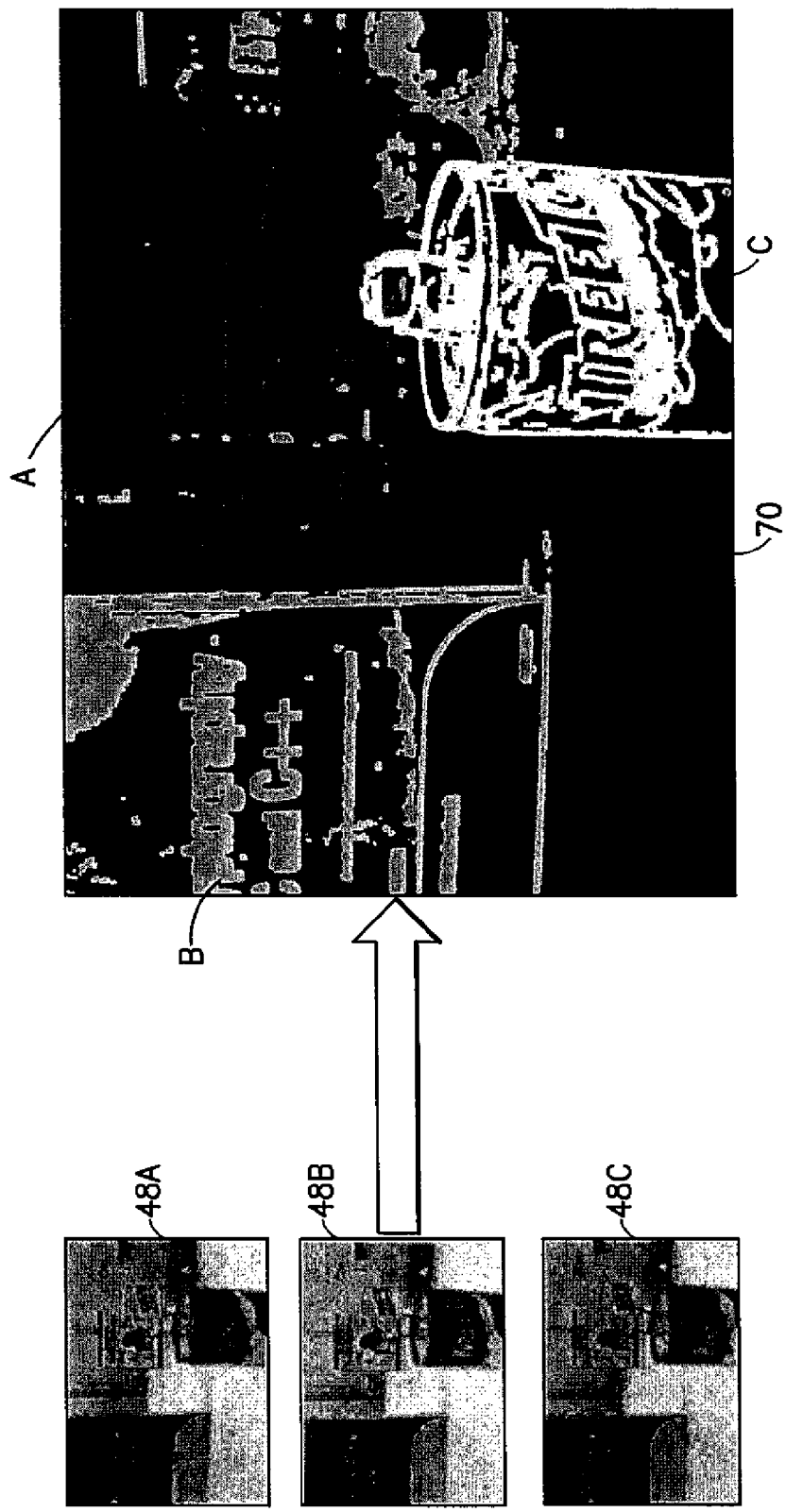
FIG. 7 is a diagram illustrating use of the focal stack of images of FIGS. 5A-5C being used to form a relative depth map.

Referring also to FIG. 6, an example of one method is shown. After the images of the focal stack are captured as indicated by block 50, an image registration may be performed as indicated by block 52. Image registration may be used to estimate a transform between the images that is caused by different lens position and/or possible hand-shake for example. The images may be aligned as indicated by block 54. The estimated transforms may be applied to the images to align them all together. Blur for pixels may be estimated as indicated by block 56. For each pixel of each focal stack image, the software may estimate the blur between this pixel and the corresponding pixel in the next frame. This may be used to form a blur map for each focal stack image. A depth map may be formed by thresholding the blur maps as indicated by block 58. The blur maps are compared to each other and thresholded to generate a relative depth map. An example of this is shown in FIG. 7 where the three images 48A, 48B, 48C are used to generate the relative depth map 70. Pixels with similar blur levels may be classified as a same depth level. An image may have a set of the sharpest pixel (the pixels which are the least blurred) among the focal stack. Those sharpest pixels are called in-focus pixels. For thresholding the blur map, basically, in a frame, a pixel that its blurriness is the least among the corresponding pixels crossing all the focal stack frames, can be considered as an in-focus pixel and labeled as "1", and all other pixels in the same frame may be labeled as "0" (zero). Here, the least blurriness could be defined as it is smaller than a percentage of the second least. For example, A<0.99*B, where A is the least and B is the second least.

Figure 8:
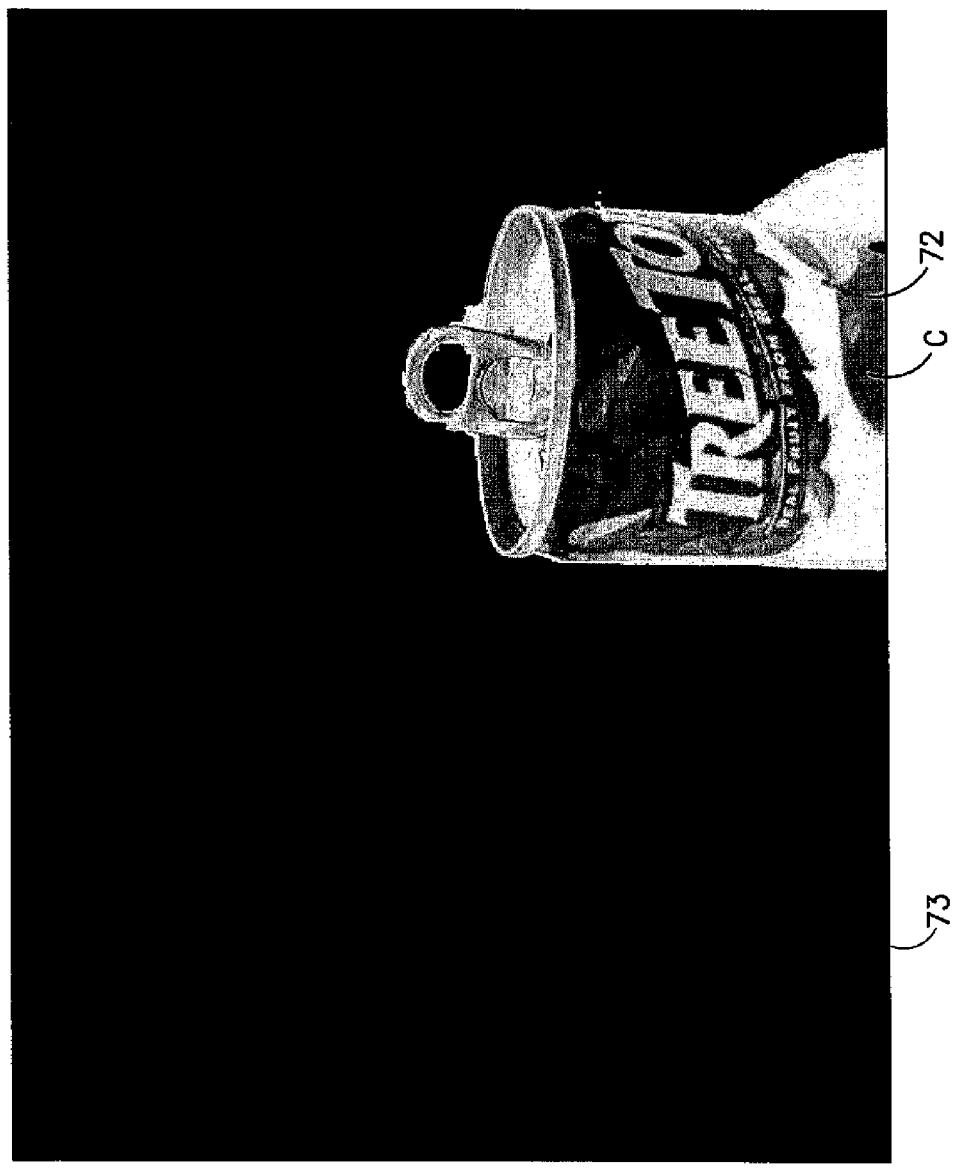
FIG. 8 is a diagram illustrating a foreground segmentation result.

As indicated by block 60, a matting image may be formed using the depth map as an input. An image matting technique is applied on the focal stack images with the corresponding in-focus pixels. For each image, the in-focus pixels are used as foreground indication, and in-focus pixels in all other focal stack images are used as background indication. The matting process results in a matting map, where each pixel value of the matting map shows a percentage of the foreground and background. As indicated by block 62 region segmentation may be performed to form the regions in each image. The matting maps are compared and thresholded to extract the foreground and/or background regions. FIG. 8 shows an example of foreground segmentation result 72.

The segmentation allows processing different segments of the image differently to achieve various effects. An example effect would be artificial background defocus. Looking at FIG. 8, the apparatus may be configured to keep the segment denoted by light color 72 as such while artificially blurring the area indicated with dark color 73, achieving an image where the background is blurred, but the foreground is intact. Furthermore, in the example in which the segmentation of focal stack is used for processing various segments differently, the processed segments may originate from only one of the images in the focal stack (not necessarily two or more of the images).

Figure 9:
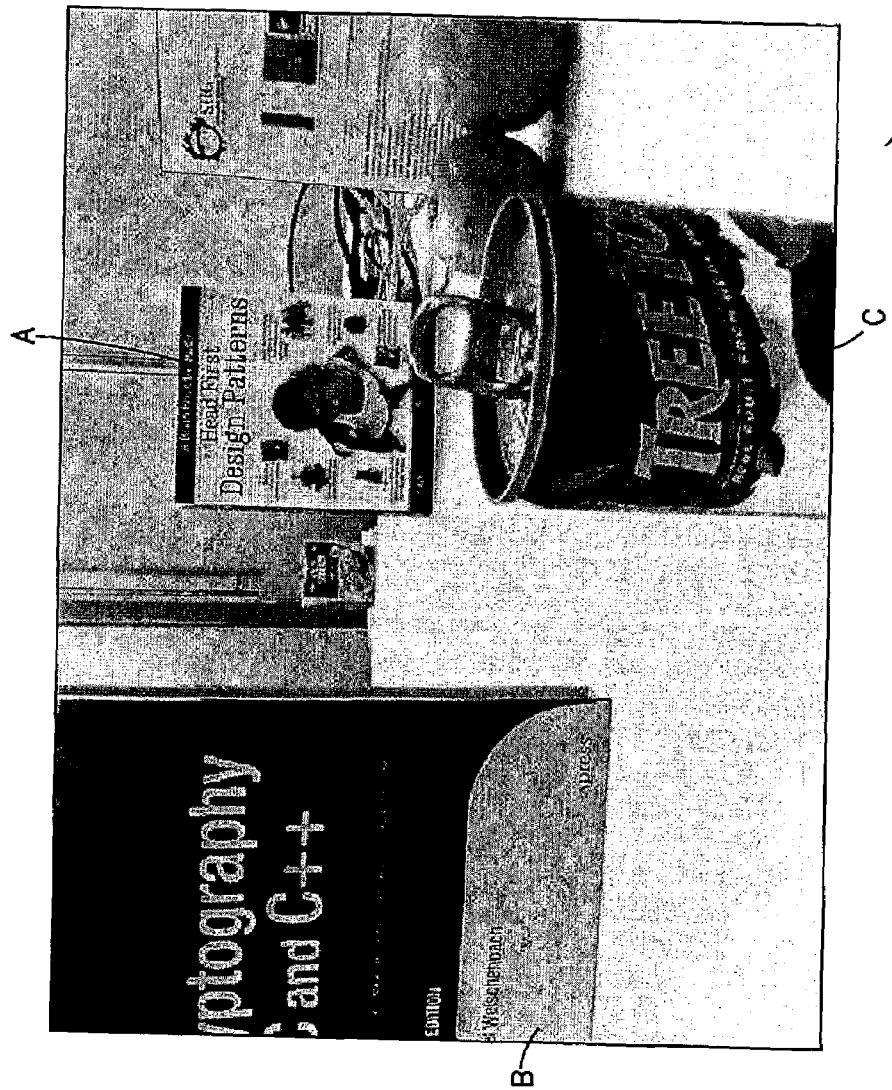
FIG. 9 is an illustration of a post-capture refocused image from the focal stack of images shown in FIGS. 5A-5C.

As illustrated by block 64, a segmentation result may be shown to the user, such as similar to FIG. 4 for example. The foreground regions are merged into one image, and border of regions are indicated on that image. The user can select one or more desired regions for refocus as indicated by block 66. This may be done, for example, by a simple touch on the touch screen 14, or by using any other technique to provide input to the apparatus 10. In an alternative method, user selection 66 might not be provided, and the apparatus and method may comprise the apparatus automatically selecting one or more (or all) of the regions to be provided in-focus in the refocused image. As indicated by block 68, the refocus image in generated by fusing the focal stack frames. FIG. 9 shows an example of all-in-focus fusion result. The image 48D has all the regions in focus including items A, B and C. This can be achieved by the user select all the picture area as the desired focus region. In an alternative, the user might have merely selected a segment region corresponding to A and not B, such that A and C would be in-focus, but B would be out of focus. This is merely an example used to illustrate features which could be used to provide different results.

Advantages of features as described herein include using multiple focal stack images to assist the matting, and no user input is needed during segmentation. All segmented regions may be shown to the user so that the user can select a desired region(s) for refocus by a simple touch. Thus, a user does not need to draw a refocus region. This does away with the problems of how to achieve the refocus capability using a conventional camera; and providing the user interface to conveniently let users choose re-focusing region(s).

An example apparatus may comprise means for automatically segmenting regions of a focal stack of images into segment regions; and means for generating a refocused image based, at least partially, upon selection of one or more of the segment regions, where the refocused image comprises different ones of the segment regions from at least two of the images of the focal stack.

The apparatus may further comprise means for a user to select the one or more of the segment regions for basing the generating of the refocused image. The means for the user to select may comprise a touch screen of the apparatus. The means for automatically segmenting regions may be configured to automatically segment the regions based upon different focus planes of the regions in each respective one of the images of the focal stack of images. The means for automatically segmenting the regions may be configured to provide image registration of images in the focal stack to estimate a transform between the images. The apparatus may be configured to apply the estimated transforms to the images to align the images together. The apparatus may be configured to, for each pixel of each focal stack image, estimate a blur between the pixel and a corresponding pixel in another one of the images of the stack, where a blur map for each focal stack image is formed. The apparatus may be configured to compare blur maps to each other, where the blur maps are thresholded to generate a relative depth map. The apparatus may be configured to classify pixels with similar blur levels as a same depth level, where each of the images have a set of in-focus ones of the pixels comprising the sharpest pixel among the focal stack. The apparatus may be configured to apply an image matting technique on the focal stack of images with the corresponding in-focus pixels. The apparatus may be configured to, for each image, use the in-focus pixels as foreground indication, and the in-focus pixels in all other ones of the focal stack images as background indication. The apparatus may be configured to provide a matting process to produce in a matting map, where each pixel value of the matting map shows a percentage of a foreground and a background. The apparatus may be configured to compare the matting maps and threshold to extract foreground and background regions. The apparatus may be configured to merge the foreground regions into one image and indicate borders of the regions. The means for generating may be configured to fuse the focal stack images into the refocused image. The means for generating the refocused image may be based, at least partially, upon the selection being a user selection of the one or more segment regions.

An example apparatus may comprise an image segmentator for a focal stack of images, where the image segmentator is configured to automatically form segment regions for each of the images; and a focal stack fuser configured to fuse the focal stack of images into a refocused image, where the refocused image comprises different ones of the segment regions from at least two of the images of the focal stack.

The apparatus may further comprise a segment region selector configured to allow a user to select the one or more of the segment regions for use in the refocused image. The segment region selector may comprise a touch screen of the apparatus. The image segmentator may be configured to automatically segment the regions based upon different focus planes of the regions in each respective one of the images of the focal stack of images. The image segmentator may be configured to provide image registration of the images of the focal stack to estimate a transform between the images. The apparatus may be configured to apply the estimated transforms to the images to align the images together. The apparatus may be configured to, for pixels of each focal stack image, estimate a blur between the pixel and a corresponding pixel in another one of the images of the stack, where a blur map for each focal stack image is formed. The apparatus may be configured to compare blur maps to each other, where the blur maps are thresholded to generate a relative depth map. The apparatus may be configured to classify pixels with similar blur levels as a same depth level, where each of the images have a set of in-focus ones of the pixels comprising the sharpest pixel among the focal stack. The apparatus may be configured to apply an image matting technique on the focal stack of images with the corresponding in-focus pixels. The apparatus may be configured to, for each image, use the in-focus pixels as foreground indication, and the in-focus pixels in all other ones of the focal stack images as background indication. The apparatus may be configured to provide a matting process to produce in a matting map, where each pixel value of the matting map shows a percentage of a foreground and a background. The apparatus may be configured to compare the matting maps and threshold to extract foreground and background regions. The apparatus may be configured to merge the foreground regions into one image and indicate borders of the regions. The focal stack fuser may be configured to generate the refocused image based, at least partially, upon a user selection of one or more segment regions.

An example method may comprise automatically segmenting regions of images of a focal stack into segment regions; and based, at least partially, upon selection of one or more of the segment regions, generating a refocused image comprising different ones of the segment regions from at least two of the images of the focal stack.

The selection of the one or more segment regions may comprise a selection by a user at a user interface. Automatically segmenting regions of the images may comprise segmenting the regions based, at least partially, upon different focus planes of the regions. The method may comprise providing image registration of images in the focal stack to estimate a transform between the images. The method may further comprise applying the estimated transforms to the images to align the images together. The method may further comprise, for pixels of each focal stack image, estimating a blur between the pixel and a corresponding pixel in another one of the images of the stack, where a blur map for each focal stack image is formed. The method may further comprise comparing blur maps to each other, where the blur maps are thresholded to generate a relative depth map. The method may further comprise classifying pixels with similar blur levels as a same depth level, where each of the images have a set of in-focus ones of the pixels comprising the sharpest pixel among the focal stack. The method may further comprise applying an image matting technique on the focal stack of images with the corresponding in-focus pixels. The method may further comprise for each image, using the in-focus pixels as foreground indication, and the in-focus pixels in all other ones of the focal stack images as background indication. The method may further comprise providing a matting process to produce in a matting map, where pixel values of the matting map shows a percentage of a foreground and a background. The method may further comprise comparing the matting maps and threshold to extract foreground and background regions. The method may further comprise merging the foreground regions into one image and indicate borders of the regions. Generating may fuse the focal stack images into the refocused image.

A example non-transitory program storage device, such as memory 24 for example, may be provided which is readable by a machine, tangibly embodying a program of instructions executable by the machine for performing operations, the operations comprising automatically segmenting regions of a focal stack of images into segment regions; and based, at least partially, upon selection of one or more of the segment regions, generating a refocused image comprising different ones of the segment regions from at least two of the images of the focal stack.

Features as described herein may use focus as a cue, and apply an image matting technique for region segmentation to generate refocus images. The matting based region segmentation can give an alpha map of the region in which percentage of the foreground/background is calculated. Also, features may be used to generate an artificial Bokeh, where the focus region and other regions are filtered differently. This approach may be fully automatic. Different refocused images may be generated without any user input. Another example of filtering focus regions and other regions differently is to apply a motion blur filter on out-of-focus region(s) such that a background motion effect can be artificially generated. Yet another example of filtering focus regions and other regions differently is to remove the color of out-of-focus region(s) such that emphasis of colorful focus region with a grey-scale background effect can be artificially generated. There are various other applications for applying filters differently on different regions. At the final stage, a user can select one of the refocused images by touching a region of the image on the touch screen. However, it is not required for the process. If there is no user input, all refocused/Bokeh images may still be generated and saved.

The refocus system may use a depth map as cue for region segmentation and refocus image generation. The refocus system may be used with static scenes for example. The refocus system may use a global image transform model as a registration for image alignment. The refocus system may use gradient for depth estimation. The refocus system may be based on a focal stack image set. Depth may be estimated using gradient. Image segmentation may be done by clustering the pixels within the same focal layer.

The focal stack system may use focal stack images to get artificial defocused/refocused images. The focal stack system may capture images using single lens with different lens position. The system requires no illumination pattern on a scene. Generation of the depth map may be derived using single view images from (de)focus. The system may an all-in-focus image if desired. The refocus may be calculated from a focal stack, in which the frames are regular, non-active images. No special setting, or encoded images, or active illumination to project specific patterns (dots) in the scene is needed. The depth estimate may be from the (de)focus image pixels.

An example apparatus may comprise an apparatus including means for segmenting at least one region of a focal stack of images into at least one segment region; and means for generating a refocused image based, at least partially, upon selection of one or more of the at least one segment region, where the refocused image comprises:
    different ones of the at least one segment region from at least two of the images of the focal stack, and/or
    the at least one segment region having been processed differently than at least one other one of the regions.

The means for generating may be configured to generate the refocused image which includes the segment regions from one or more of the different focal plane images, where pixels within some of the regions are processed through digital image processing.

An example apparatus may comprise at least one processor; and at least one memory including computer program code, where the at least one memory and the computer program code are configured to, with the at least one processor, to:

segment regions of a focal stack of images into segment regions; and based, at least partially, upon selection of one or more of the segment regions, generate a refocused image comprising different ones of the segment regions from at least two of the images of the focal stack.

An example apparatus may comprise at least one processor; and at least one memory including computer program code, where the at least one memory and the computer program code are configured, with the at least one processor, to form a segment region for one or more of the images; and generate a new image based, at least partially, upon selection of the segment region(s), where the new image comprises the segment region(s) having been processed differently than at least one other one of the segment regions.

An example apparatus may comprise at least one processor; and at least one memory including computer program code, where the at least one memory and the computer program code are configured, with the at least one processor, to form segment regions for one or more of the images; digitally image process at least two of the segment regions differently; and generate a new image based, at least partially, upon selection of the at least two segment regions.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one memory including computer program code, wherein the at least one memory and the computer program code, with the at least one processor, cause the apparatus to:
   form segment regions for at least some images in a focal stack of images;
   fuse the focal stack of images into a refocused image, wherein the refocused image comprises different ones of the segment regions from at least two of the images of the focal stack;
   for pixels of each image of the focal stack, estimate a blur between each pixel and a corresponding pixel in another one of the images of the focal stack to form a blur map for each image of the focal stack;
   compare blur maps to each other, wherein the blur maps are thresholded to generate a relative depth map;
   classify pixels with similar blur levels as a same depth level, wherein at least one of the images has a set of in-focus ones of the pixels comprising a sharpest pixel among the focal stack; and
   apply an image matting technique on the focal stack of images with corresponding in-focus pixels.

2. An apparatus as in claim 1, wherein the apparatus is further caused to allow a user to select one or more of the segment regions for use in the refocused image.

3. An apparatus as in claim 1, wherein the apparatus is further caused to segment regions based on different focus planes of the regions in respective ones of the images of the focal stack of images.

4. An apparatus as in claim 1, wherein the apparatus is further caused to provide image registration of images of the focal stack to estimate a transform between the images.

5. An apparatus as in claim 4, wherein the apparatus is further caused to apply the transform to the images to align the images together.

6. An apparatus as in claim 1, wherein the apparatus is further caused, for each image, to use in-focus pixels as foreground indication, and in-focus pixels in all other ones of the focal stack images as background indication.

7. A method comprising:
   forming segment regions for at least some images in a focal stack of images;
   fusing the focal stack of images into a refocused image, wherein the refocused image comprises different ones of the segment regions from at least two of the images of the focal stack;
   for pixels of each image of the focal stack, estimating a blur between each pixel and a corresponding pixel in another one of the images of the focal stack to form a blur map for each image of the focal stack;
   comparing blur maps to each other, wherein the blur maps are thresholded to generate a relative depth map;
   classifying pixels with similar blur levels as a same depth level, wherein at least one of the images has a set of in-focus ones of the pixels comprising a sharpest pixel among the focal stack; and
   applying an image matting technique on the focal stack of images with corresponding in-focus pixels.

8. A method as in claim 7, further comprising enabling a user to select one or more of the segment regions for use in the refocused image.

9. A method as in claim 7, further comprising segmenting regions based on different focus planes of the regions in respective ones of the images of the focal stack of images.

10. A method as in claim 7, further comprising providing image registration of images of the focal stack to estimate a transform between the images.

11. A method as in claim 10, further comprising applying the transform to the images to align the images together.

12. A method as in claim 7, further comprising, for each image, using in-focus pixels as foreground indication, and in-focus pixels in all other ones of the focal stack images as background indication.

13. A non-transitory program storage device readable by a machine, tangibly embodying a program of instructions executable by the machine for performing operations, the operations comprising:
   forming segment regions for at least some images of a focal stack of images;
   fusing the focal stack of images into a refocused image, wherein the refocused image comprises different ones of the segment regions from at least two of the images of the focal stack;
   for pixels of each image of the focal stack, estimating a blur between each pixel and a corresponding pixel in another one of the images of the focal stack to form a blur map for each image of the focal stack;
   comparing blur maps to each other, wherein the blur maps are thresholded to generate a relative depth map;
   classifying pixels with similar blur levels as a same depth level, wherein at least one of the images has a set of in-focus ones of the pixels comprising a sharpest pixel among the focal stack; and applying an image matting technique on the focal stack of images with corresponding in-focus pixels.

\* \* \* \* \*